US010118327B2

(12) United States Patent
Schenzle et al.

(10) Patent No.: US 10,118,327 B2
(45) Date of Patent: Nov. 6, 2018

(54) METHOD FOR THE SOUND DAMPING AND/OR SOUND INSULATION OF COMPONENTS

(71) Applicant: Henkel AG & Co. KGAA, Duesseldorf (DE)

(72) Inventors: Bernd Schenzle, Heidelberg (DE); Josef Giesinger, Eppelheim (DE); Jozef Hudina, Ketsch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 463 days.

(21) Appl. No.: 14/744,084

(22) Filed: Jun. 19, 2015

(65) Prior Publication Data

US 2015/0283749 A1    Oct. 8, 2015

Related U.S. Application Data

(63) Continuation of application No. PCT/EP2013/077281, filed on Dec. 19, 2013.

(30) Foreign Application Priority Data

Dec. 19, 2012 (DE) .................. 10 2012 223 757

(51) Int. Cl.
  *B29C 47/02* (2006.01)
  *B29L 31/00* (2006.01)
  (Continued)

(52) U.S. Cl.
  CPC ........ *B29C 47/025* (2013.01); *B29C 47/0866* (2013.01); *B29C 47/1027* (2013.01);
  (Continued)

(58) Field of Classification Search
  CPC ........ B29K 2995/0063; B29K 2095/00; B29K 2105/06; B29K 2105/12; B29K 2105/16;
  (Continued)

(56) References Cited

U.S. PATENT DOCUMENTS 3,489,242 A * 1/1970 Gladding ................ B32B 15/08
                                                          181/208
3,904,456 A * 9/1975 Schwartz .............. E04B 1/8409
                                                          156/71

(Continued)

FOREIGN PATENT DOCUMENTS

DE    3503984    9/1985
DE    19956335   5/2001
(Continued)

OTHER PUBLICATIONS

International Search Report issued in connection with International Patent Application No. PCT/EP2013/077281 dated Mar. 28, 2014.

*Primary Examiner* — Jeffrey M Wollschlager
(74) *Attorney, Agent, or Firm* — James E. Plotrowski

(57) ABSTRACT

A description is given of a method for the sound damping and/or sound insulation of metallic parts and/or plastic parts in which thermoplastic compounds are applied to the parts as a defined profile by direct extrusion at melting temperatures of between 120 and 300° C., wherein, before the heating, the compounds are in the form of granules with a density of 1.5 to 5 g/cm$^3$.

12 Claims, 2 Drawing Sheets

(51) Int. Cl.
*B29K 105/06* (2006.01)
*B29K 105/16* (2006.01)
*B29C 47/08* (2006.01)
*B29C 47/10* (2006.01)

(52) U.S. Cl.
CPC ...... *B29K 2105/06* (2013.01); *B29K 2105/16* (2013.01); *B29K 2995/00* (2013.01); *B29K 2995/0063* (2013.01); *B29L 2031/762* (2013.01)

(58) Field of Classification Search
CPC .............. B29C 47/025; B29C 47/1027; B29C 47/0866; B29L 2031/762
See application file for complete search history.

(56) References Cited

U.S. PATENT DOCUMENTS

| | | | |
|---|---|---|---|
| 4,186,234 A | 1/1980 | Hiratsuka et al. | |
| 4,379,190 A * | 4/1983 | Schenck | D06N 7/0071 428/95 |
| 4,438,228 A * | 3/1984 | Schenck | C08L 23/0815 428/95 |
| 5,221,580 A * | 6/1993 | Amory | B29B 9/12 427/207.1 |
| 5,350,793 A * | 9/1994 | Kishimoto | C08K 3/0033 524/425 |
| 5,358,397 A | 10/1994 | Ligon et al. | |
| 5,418,040 A * | 5/1995 | Kaneko | B05D 3/0263 427/239 |
| 5,695,881 A * | 12/1997 | Henderson | C08J 3/124 428/403 |
| 5,741,824 A | 4/1998 | Butschbacher et al. | |
| 6,110,985 A * | 8/2000 | Wheeler | B32B 5/18 521/101 |
| 6,112,848 A * | 9/2000 | Ang | B29C 47/0019 181/207 |
| 6,390,383 B1 | 5/2002 | Fusaro et al. | |
| 6,716,527 B1 * | 4/2004 | Czmok | B01J 2/006 428/403 |
| 6,787,593 B2 * | 9/2004 | Bell | B60N 3/048 156/334 |
| 6,861,100 B1 | 3/2005 | Schucker | |
| 7,448,671 B2 * | 11/2008 | Rackers | B60R 13/0815 296/187.01 |
| 7,799,840 B2 * | 9/2010 | Wheeler | C08J 9/103 521/142 |
| 2002/0095007 A1 * | 7/2002 | Larock | C08F 4/14 524/310 |
| 2003/0131791 A1 * | 7/2003 | Schultz | B05B 13/0431 118/324 |
| 2003/0140671 A1 * | 7/2003 | Lande | B05D 1/265 72/46 |
| 2005/0189442 A1 * | 9/2005 | Hussaini | B05B 1/202 239/556 |
| 2005/0202213 A1 | 9/2005 | Yanai | |
| 2008/0093778 A1 * | 4/2008 | Johnson | D01D 4/025 264/555 |
| 2009/0042055 A1 | 2/2009 | Sinsel et al. | |
| 2009/0295020 A1 * | 12/2009 | Krause | B29C 47/0014 264/211.14 |
| 2010/0065368 A1 * | 3/2010 | Tazian | B29C 43/003 181/290 |
| 2010/0267853 A1 * | 10/2010 | Edry | C09D 5/18 521/145 |
| 2012/0012420 A1 | 1/2012 | Classen et al. | |
| 2012/0013228 A1 | 1/2012 | Fritz et al. | |
| 2012/0228899 A1 * | 9/2012 | Rich | B62D 65/14 296/191 |
| 2012/0258325 A1 * | 10/2012 | Zuercher | B29C 47/0021 428/513 |

FOREIGN PATENT DOCUMENTS

| | | |
|---|---|---|
| DE | 10137214 | 6/2002 |
| DE | 10312443 | 10/2003 |
| DE | 10342753 | 8/2007 |
| DE | 102007029644 | 1/2009 |
| EP | 0294141 * | 5/1988 |
| EP | 0766714 | 4/1997 |
| EP | 0787576 | 8/1997 |
| EP | 702708 | 3/1998 |
| EP | 1582268 | 10/2005 |
| EP | 2407079 | 1/2012 |
| JP | 55-71734 A | 5/1980 |
| JP | 56-140175 A | 11/1981 |
| JP | 63-61071 A | 3/1988 |
| JP | 10-226027 A | 8/1998 |
| JP | 2003-266014 A | 9/2003 |
| WO | 9105819 | 5/1991 |
| WO | 2006076958 | 7/2006 |
| WO | 2010055468 | 5/2010 |

* cited by examiner

METHOD FOR THE SOUND DAMPING AND/OR SOUND INSULATION OF COMPONENTS

The present invention relates to a method for the sound damping and/or sound insulation of metallic parts and/or plastic parts.

Almost exclusively very thin-walled metallic sheets or plastic parts are currently used in the manufacture of modern appliances, apparatuses, and machines. Mechanically moving parts, washing and rinsing operations, or running motors unavoidably set these metal sheets or plastic parts into vibration, which vibrations are often in the audible range of the human ear. These vibrations are transmitted in the form of structure-borne noise over the entire machine, apparatus, or appliance, and may be radiated into the air as objectionable noise to distant locations. For reducing the sound radiation and for damping structure-borne noise, in automobile construction or in the manufacture of household appliances these metal sheets or plastic parts are therefore provided with sound-damping coatings, so-called antidrumming coatings.

According to conventional practice, mixtures of fillers having a high specific gravity and bitumen are extruded to form films from which the appropriate molded parts are then punched or cut. These films are subsequently adhesively bonded to the sheet metal parts in question, wherein it may still be necessary to adapt them to the shape of the sheet metal by heating.

According to the teaching of EP 2407079 A2, for manufacturing a dishwasher a prefabricated bitumen mat is adhesively bonded to at least one part by applying a ready-to-use, flowable, reactively curable bituminous mixture to the part and/or to the bitumen mat in such a way that at least one preferably elongated, in particular linear or strand-shaped, adhesive bead results which is at least partially surrounded by at least one area that is not acted on, i.e., is free of the reactive bitumen compound, and pressing together the part and the bitumen before the bituminous mixture cures.

Although these bitumen films are still frequently used due to their low material cost, they are very brittle and tend to flake off from the sheet metal, in particular at low temperatures. In addition, the often proposed additions of elastomers result in only a slight improvement, which is inadequate for many applications. Furthermore, applying preformed bitumen parts to sheet metal parts of machines or vehicles, which sheet metal parts have very complicated shapes or are difficult to access, is not possible at all. A further disadvantage is that in many cases a plurality of punched parts is necessary for a single machine or a single appliance, which requires costly warehousing.

EP 0766714 A describes plastisol compositions based on vinyl chloride-vinyl acetate copolymers which have been produced according to the suspension polymerization process. These plastisol compositions have a low viscosity, even when the polymer/softener ratio is low, so that they may be used in airless spraying and may be easily gelled. The cited document further discloses that coatings based on the stated plastisols exhibit a good noise-damping effect. The document proposes use of these plastisols in the underbody area of motor vehicles, including the wheel wells, for structure-borne noise-damping coating, and for corrosion protection and protection from abrasion.

Similarly, EP 702708 A describes sound-damping coatings for sheet metal in the underbody area of motor vehicles, the coatings being based on plastisols consisting of 5 to 60% by weight of at least one powdered styrene copolymer or methyl methacrylate homopolymer or copolymer of methyl methacrylate, 5 to 65% by weight of softener, 0 to 40% by weight of fillers, 2 to 40% by weight of reactive additives, and optionally further additives. According to the cited document, the plastisol formulations described therein are suitable for producing abrasion-resistant, single-layer coverings on sheet metal which may be applied in the injection molding process, in particular in the underbody area of motor vehicles, for reducing the noise caused by impingement by particles, for corrosion protection, and for achieving an abrasion-resistant coating.

WO 91/05819 describes thermoplastic compounds for use as sound-damping and vibration-insulating laminated or layered bodies, in particular for motor vehicles. The thermoplastic compositions contain 0.6 to 50% chlorinated polyethylene, 20 to 95% fillers, and 4 to 60% softener which is compatible with the chlorinated polyethylene. It is stated that these thermoplastic compositions may be used as layered material in motor vehicles, buildings, household appliances, and industrial machines for sound damping and vibration insulation.

Extrudable, low-viscosity rubber damping compounds based on liquid rubbers or elastomers and vulcanizing agents are known from WO 2006/076958 A1, which contain small quantities of structure-reinforcing fiber fillers; these rubber damping compounds are characterized by the absence of previously customary solid rubbers, and have a very low viscosity when applied. These types of acoustic compounds are extrudable by means of fully automatic application facilities, and are preferably processed in body shell production in vehicle manufacturing.

However, the long holding times at high temperatures in the automotive manufacturing painting lines following the body shell production are not available in normal machine, apparatus, and appliance manufacturing. Therefore, for these fields of application as well, there is a need to provide a method in which products which are injectable or extrudable on site may be applied in very short cycle times, thus simplifying on-site warehousing.

The achievement of the object according to the invention is stated in the patent claims. The object of the invention is essentially to provide a method for the sound damping and/or sound insulation ("sound deadening") of metallic parts and/or plastic parts, in which thermoplastic compounds are applied to the parts as a defined profile by direct extrusion at melting temperatures between 120 and 300° C., wherein, prior to the heating, the compounds are present in the form of granules having a density of 1.5 to 5 g/cm$^3$.

Metallic parts are preferably thin-walled sheets made of steel, aluminum, and in particular stainless steel. Plastic parts may be made, for example, of thin-walled PVC polymers, polycarbonate polymers, polypropylene polymers, or acrylonitrile-butadiene-styrene (ABS) polymers, or glass fiber-reinforced plastics (GFRP). Plastic plates may be preferred parts.

The method according to the invention may preferably be used wherever the long holding times at high temperatures in the painting lines in automotive manufacturing are not available.

These parts to be coated may be a component of so-called "white goods," i.e., household appliances or household machines such as dishwashers or washing machines, or of bathtubs, shower basins, shower trays, or sinks. However, they may also be a component of data processing devices (computers), pump housings, compressors, agricultural vehicles and equipment, medical devices, or turret housings of wind turbines.

The granulate (also referred to as pellets) may have a grain diameter of 0.5 mm to 30 mm, preferably 2 to 10 mm. The grain size may be determined by sieve analysis, for example. The grain preferably has a spherical or lenticular shape, but may also be elliptical or cylindrical. The surface of the granulate particles should preferably be non-sticky and block-free in order to avoid agglutination into larger aggregates during storage and transport of the granulate.

Within the meaning of the present invention, thermoplastic compounds are mixtures of thermoplastic polymers of a single type, to which fillers, optionally reinforcing materials, and/or other additives have been added. The compounds, prior to heating in granulate form, have a density of 1.5 to 5 g/cm$^3$. The stated density should thus correspond to the density at room temperature, preferably at 20° C. To achieve a high density of the thermoplastic compounds, these should have a high filling rate, i.e., a filler content of at least 60% by weight.

Examples of thermoplastic polymers to be used are vinyl polymers, in particular ethylene vinyl acetate (EVA), polyolefins, polyamides (PA), polyesters, polyacetals, polycarbonates, polyurethanes, and ionomers, or also bitumen. Mixtures of the above-mentioned thermoplastic polymers of a single type may also optionally be used. EVA, PA, or mixtures thereof are particularly preferred.

Inorganic salts or oxides, preferably those having a high density between 2.5 and approximately 12 g/cm$^3$, are used as fillers. Examples of such fillers are zinc oxide (ZnO), tin dioxide ($SnO_2$), titanium dioxide (titanium(IV) oxide, $TiO_2$), iron oxides, in particular iron(II) oxide (FeO), iron(III) oxide (iron sesquioxide ($Fe_2O_3$)), iron(II,III) oxide (ferrosferric oxide ($Fe_3O_4$, magnetite)), barium sulfate ($BaSO_4$), lead sulfate (lead vitriol, $PbSO_4$), aluminum hydroxide (in the form of hydrargillite, bayerite, nordstrandite, for example), or also aluminum metahydroxide (in the form of diaspore or boehmite, for example), hafnium boride, hafnium carbide, hafnium nitride, hafnium dioxide ($HfO_2$), tungsten oxides (for example, tritungsten oxide ($W_3O$), tungsten dioxide (tungsten(IV) oxide, $WO_2$), tungsten trioxide (tungsten(VI) oxide, $WO_3$)), rhenium dioxide ($ReO_2$), rhenium trioxide ($ReO_3$), and rhenium heptoxide ($Re_2O_7$).

Another option is to use the corresponding powdered stone or ore as filler. Examples of such are dolomite, cassiterite (tinstone, $SnO_2$), bismuth blende (eulytite, agricolite, $Bi_4(SiO_4)_3$), bismuth glance (bismuthinite, $Bi_2S_3$), ilmenite (titanic iron, $FeTiO_3$), and powdered granite.

The use of barium sulfate, iron oxides, aluminum hydroxides, or a mixture thereof is particularly preferred.

The fillers to be used have a grain size range between 0.01 and 5000 µm, preferably between 0.1 and 100 µm, particularly preferably between 0.5 and 20 µm.

Examples of additives are hot-melt adhesives and/or bonding agents, and release agents.

The thermoplastic compound to be used according to the invention preferably contains 10 to 30% by weight, particularly preferably 15 to 25% by weight, of thermoplastic polymers, 70 to 90% by weight, particularly preferably 65 to 85% by weight, of filler(s), and 0 to 10% by weight, particularly preferably 1 to 5% by weight, of a hot-melt adhesive, the sum of the constituents being 100% by weight.

The filled thermoplastic polymers and the hot-melt adhesive may be present in the compound in granulated form as a mixture or conglomerate. Alternatively, the granulate particles of the filled thermoplastic polymer may be coated with the hot-melt adhesive.

A possible tendency toward agglutination or agglomeration of the granulate particles may also be avoided by surface treatment of the granulate particles. For this purpose, the surface of the granulate particles is coated with a suitable release agent; this release agent may be, for example, talcum, pyrogenic silicic acid, molecular sieve powder, carbon black, polyethylene powder, ethylene vinyl acetate powder, or some other fine-particle nonreactive polymer powder. In principle, release agents which are meltable at a slightly elevated temperature, such as waxes, may also be sprayed onto the granulate surface.

Prior to extrusion, the filled granulate and the hot-melt adhesive are compounded and provided to the user as a finished product. Alternatively, the filled granulate and the hot-melt adhesive are brought separately to the place of application, and mixed inline there and fed to the extruder.

The ready-to-use thermoplastic compound may be fed to the extruder by gravity or by pneumatic conveying systems. In this context, pneumatic conveying systems are understood to mean suction and/or blowing conveyors.

The feeding of the thermoplastic compound or of the components containing the filled granulate and the hot-melt adhesive and/or further auxiliary materials preferably takes place by continuous gravimetric or volumetric metering in such a way that, depending on the application, a defined profile of constant or predefined variable dimensions is applied directly from the extruder to the optionally preheated substrate to be coated. Alternatively, the individual components of the compound may be fed to the extruder in exact quantities.

The preheating of the substrate prior to the coating at a defined temperature may take place by infrared radiation, laser radiation, or supplying hot air, or for metallic substrates may also take place by inductive means. The inductive preheating may in particular take place dynamically; i.e., a sensor determines the substrate temperature, which is then compared to a predefined setpoint value in order to determine therefrom the necessary heating power of the induction heater and to adjust same. Appropriate preheating devices are preferably mounted directly at the extruder head or immediately upstream therefrom, so that the preheating takes place close to the time of the coating.

For coating the substrate, the part to be coated and the extruder head with a nozzle mounted thereon must undergo a relative motion with respect to one another. The following procedure may be used to produce the relative motion:
  the part remains still and the nozzle moves, or
  the part and the nozzle both move, or
  the nozzle is stationary and the part moves.

The relative motion is preferably produced by manipulators. Within the meaning of the present invention, manipulators are devices which allow a physical interaction with the environment. In the case at hand, this is the movable portion of the structure which carries out the mechanical work of the extruder head.

For the case of the moving nozzle, the manipulator used may be a robot having five or six rotation or displacement axes (rotatory or translatory axes), as the result of which the combination of the individual motions is formed into an overall motion.

The robot may support the extruder together with the preheating device and carry out the relative motions. Similar robots are described in the documents U.S. Pat. No. 5,358, 397, EP 0787576 B1, and DE 10137214 A1, for example.

When the part as well as the extruder nozzle move, the manipulator is preferably stationarily mounted next to a conveyor belt, wherein the manipulator moves the extruder mounted thereon or the extruder nozzle only along two mutually orthogonal axes. The part to be coated is passed horizontally on a conveying device past the manipulator station, this conveying device optionally being provided with guide devices transverse to the transport direction which control the beginning and end of the extrusion of the coating material.

When the nozzle is stationarily mounted, the part to be coated is passed by the nozzle of the extruder by means of a suitable robot. The robot has two to six rotation or displacement axes, depending on the geometry and size of the part to be coated.

Prior to the mounting which subsequently takes place on or in the device or the machine, the parts coated in this way are optionally completely cured, utilizing process heat that is present from painting devices.

In another procedure, the part which is coated with the sound-damping or sound-insulating compound is initially installed in the device or the machine, and the subsequent process heat, for example from a painting device that is present, is utilized for final curing of the compound.

Further features and particulars of the method according to the invention are explained in greater detail below with reference to the drawings.

The drawings show the following:

Figure 1:
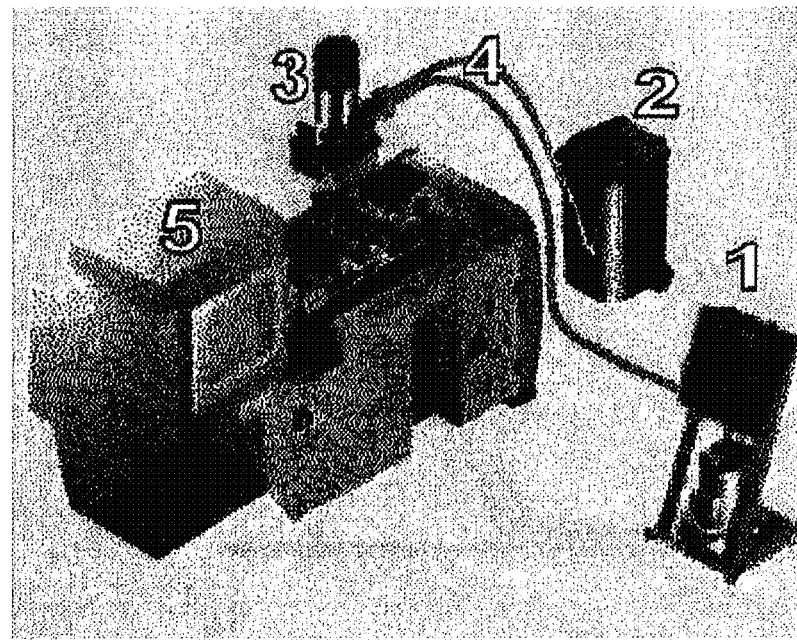
FIG. 1 shows one possible embodiment of the direct extrusion device.

The important parts of a direct extrusion device are illustrated in FIG. 1. The blower station 1 contains, among other things, a filter for keeping the conveying air free of suspended particles and dust. The conveying air is used for pneumatically transporting the filled granulate, which is to be extruded, from the storage tank 2 via the tube 4 and into the feed hopper 3 of the extruder 5. The granulate is conveyed in the predefined quantity from the feed hopper into the extruder by automatic control. The extruder nozzle and the device for positioning the parts to be coated are not visible in the illustration.

Figure 2:
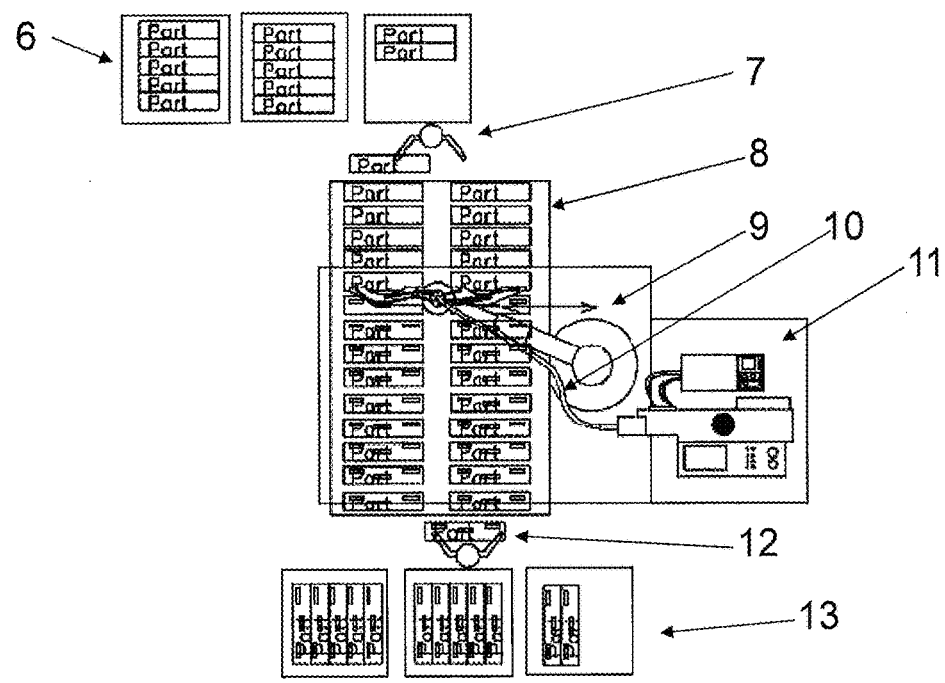
FIG. 2 shows a complete structure for carrying out the method of coating parts according to the invention.

FIG. 2 shows a coating unit in which the part as well as the nozzle move. The transport device 6 supplies the parts to be coated from the warehouse or a preparation station to the coating unit. The parts are supplied to the conveying device 8 at location 7. This may take place manually, as illustrated here, or also by machine by means of suitable known manipulators. The device 8 brings about transport of the parts in the horizontal direction to the predetermined coating station 9, which in the illustrated case is a stationary manipulator or a robot having, for example, three rotation or displacement axes. A device for heating the part is not visible. In the particular case illustrated, the robot arm supports only the extrusion nozzle, and the compound, which has already been melted in the extruder 11, is conveyed from the extruder to the extrusion nozzle at the end of the robot arm via the tube connection 10. After the coating, the parts are conveyed to station 12, and at this location are transported on a further conveyor belt to packaging or further processing. In FIG. 2, the supplying of the coated parts from the conveying device 8 to the conveyor belt 13 is likewise illustrated as a manual operation. Here as well, this may take place by means of suitable known manipulators.

Figure 3:
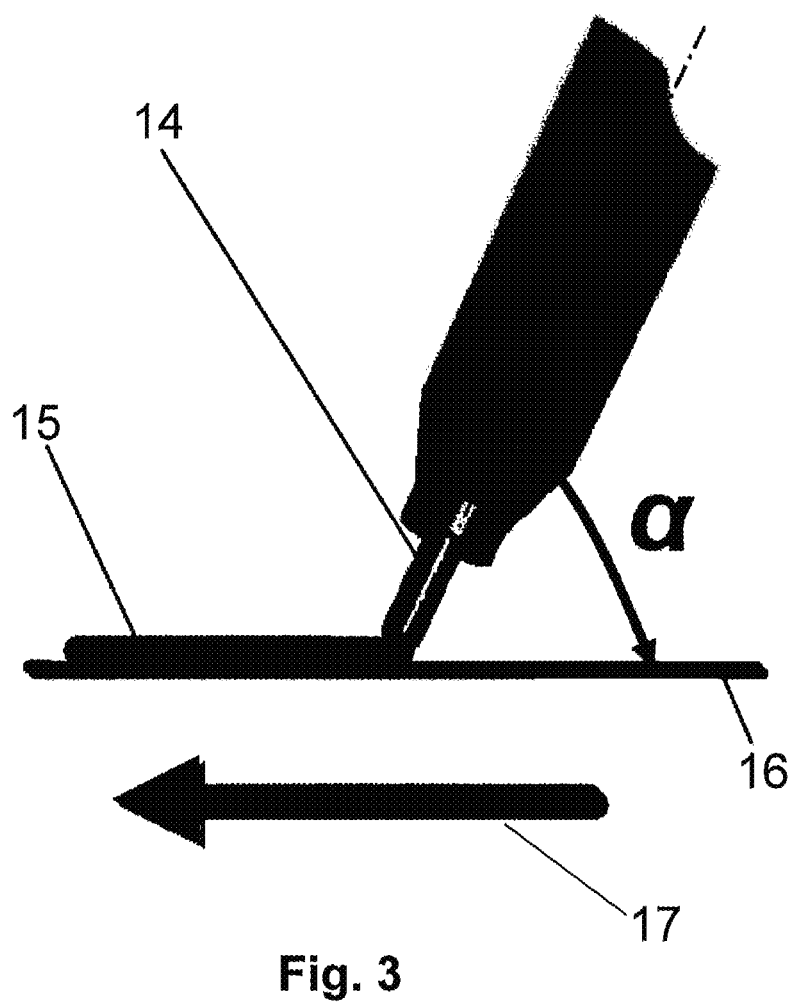
FIG. 3 shows a detail of the arrangement of the extrusion nozzle.

FIG. 3 shows a detail of the extrusion nozzle 14, which is guided, at an angle α which is kept constant, over the substrate 16 which is coated with the compound 15. This is important so that the predetermined coating thickness and geometry may be maintained. The arrow 17 indicates the relative motion of the part 16 with respect to the nozzle 14.

As already described above, the specific configuration of the conveying device and of the coating station depend on the size and geometry of the parts to be coated. If the part to be coated is, for example, a complete wash container of a washing machine or of a dishwasher, or a turret housing, the configuration of the conveying devices for supplying the parts to the coating station must be coordinated with the coating station. In addition, the manipulator or robot which carries out the coating must have a corresponding design. Devices of this type are already known from the automotive industry, for example.

What is claimed is:

1. A method for sound damping and/or sound insulation of metallic parts and/or plastic parts, characterized in that thermoplastic compounds are applied to the parts as a defined profile by direct extrusion at melting temperatures between 120 and 300° C., wherein, prior to heating for the direct extrusion, the compounds are present in the form of granules having a density of 1.5 to 5 g/cm$^3$, wherein:
the thermoplastic compound granules comprise a filled thermoplastic polymer comprising polyamide or bitumen, which is highly filled with inorganic salts, coated with a hot-melt adhesive based on polyamide or polyolefins.

2. The method according to claim 1, wherein the parts are used for household appliances or household machines, or are a component of household appliances or household machines.

3. The method according to claim 1, wherein the parts are sinks, bathtubs, shower basins, or shower trays.

4. The method according to claim 1, wherein the parts are made of stainless steel, PVC polymers, polycarbonate polymers, polypropylene polymers, acrylonitrile-butadiene-styrene (ABS) polymers, or glass fiber-reinforced plastics (GFRP).

5. The method according to claim 1, wherein
the inorganic salts are selected from barium sulfate, aluminum hydroxide, and/or iron oxides and/or
the compounds have densities between 2.1 and 4.5 g/cm$^3$ and/or
the thermoplastic compounds are applied at temperatures between 180 and 250° C.

6. The method according to claim 1, wherein the part to be coated and an extruder head with a nozzle mounted thereon undergo a relative motion with respect to one another, wherein
the part remains still and the nozzle moves, or
the part and the nozzle both move, or
the nozzle is stationary and the part moves.

7. The method according to claim 1, wherein the granules are fed to the direct extrusion by gravity or pneumatically.

8. The method according to claim 1, wherein the extruder is mounted on a manipulator or a robot arm.

9. The method according to claim 1, wherein the part to be coated is tempered to a defined temperature by laser radiation or by dynamic inductive means prior to the coating.

10. The method according to claim 7, wherein the granules are fed to the direct extrusion by gravity or pneumatically by continuous gravimetric or volumetric means.

11. The method according to claim 1, wherein the filled thermoplastic polymer comprises polyamide.

12. The method according to claim 1, wherein the filled thermoplastic polymer comprises bitumen.

\* \* \* \* \*